US007939202B2

United States Patent
Sakamoto et al.

(10) Patent No.: US 7,939,202 B2
(45) Date of Patent: May 10, 2011

(54) METHOD FOR PRODUCING LITHIUM-CONTAINING TRANSITION METAL OXIDE

(75) Inventors: Takahiro Sakamoto, Osaka (JP); Hidekazu Hiratsuka, Osaka (JP); Shinji Arimoto, Osaka (JP)

(73) Assignee: Panasonic Corporation, Osaka (JP)

(*) Notice: Subject to any disclaimer, the term of this patent is extended or adjusted under 35 U.S.C. 154(b) by 0 days.

(21) Appl. No.: 12/364,901

(22) Filed: Feb. 3, 2009

(65) Prior Publication Data

US 2009/0194734 A1     Aug. 6, 2009

Related U.S. Application Data

(60) Provisional application No. 61/025,952, filed on Feb. 4, 2008.

(51) Int. Cl.
| | |
|---|---|
| *H01M 4/58* | (2010.01) |
| *H01M 4/00* | (2006.01) |
| *H01M 4/50* | (2010.01) |
| *H01M 4/02* | (2006.01) |
| *H01M 4/16* | (2006.01) |
| *C01G 49/00* | (2006.01) |
| *C01G 45/12* | (2006.01) |

(52) U.S. Cl. ............. 429/231.95; 429/231.3; 429/223; 429/224; 429/209; 429/213; 423/594; 423/599

(58) Field of Classification Search .......... 252/182; 429/231.3, 223, 224, 231.95, 304, 322; 423/594, 423/599
See application file for complete search history.

(56) References Cited

U.S. PATENT DOCUMENTS

2003/0022063 A1 * 1/2003 Paulsen et al. ............ 429/231.3
2006/0134521 A1    6/2006 Shima

FOREIGN PATENT DOCUMENTS

| JP | 10152327 | * 6/1998 |
|---|---|---|
| JP | 11-307094 | 11/1999 |
| JP | 2000-030705 | 1/2000 |
| JP | 2002-110167 | 12/2002 |
| JP | 2005-123179 | 5/2005 |

OTHER PUBLICATIONS

International Search Report issued in International Patent Application No. PCT/JP2009/000117 dated Apr. 21, 2009.

* cited by examiner

*Primary Examiner* — Ling-Siu Choi
*Assistant Examiner* — Monique Peets
(74) *Attorney, Agent, or Firm* — McDermott Will & Emery LLP

(57) ABSTRACT

A method for producing a lithium-containing transition metal oxide represented by the general formula: $Li[Li_x(Ni_a M_{1-a})_{1-x}]O_2$ where M is metal other than Li and Ni, $0 \leq x$, and $0 < a$. The method includes: (i) mixing a transition metal compound containing Ni and M in a molar ratio of $a:(1-a)$ with lithium carbonate in a predetermined ratio; (ii) causing the temperature of the mixture to reach a predetermined temperature range while repeatedly raising and lowering the temperature thereof; and (iii) thereafter reacting the transition metal compound with the lithium carbonate in the predetermined temperature range.

16 Claims, 2 Drawing Sheets

METHOD FOR PRODUCING LITHIUM-CONTAINING TRANSITION METAL OXIDE

RELATED APPLICATIONS

This non-provisional application claims priority under 35 U.S.C. §119(e) of U.S. Provisional Application No. 61/025,952 filed on Feb. 4, 2008, the disclosure of which Application is incorporated by reference herein.

FIELD OF THE INVENTION

The invention relates to a method for producing a lithium-containing transition metal oxide that is useful as a positive electrode active material for non-aqueous electrolyte batteries such as lithium secondary batteries.

BACKGROUND OF THE INVENTION

With the recent spread of cordless, portable devices such as AV appliances and personal computers, there is an increasing demand that batteries for powering such devices should be smaller, more light-weight, and higher in energy density. In particular, there is large expectation for lithium secondary batteries having high energy density, and their potential market size is also large.

Most of the currently commercially available lithium secondary batteries use $LiCoO_2$ as a positive electrode active material, but Co is expensive. Thus, various alternative positive electrode active materials to $LiCoO_2$ are being studied. Among them, lithium-containing transition metal oxides are being intensively studied.

For example, $LiNiO_2$ having a layer structure is expected to provide a large discharge capacity. However, $LiNiO_2$ deteriorates greatly since its crystal structure changes due to charge/discharge. Hence, in order to stabilize the crystal structure during charge/discharge, adding various elements to $LiNiO_2$ has been proposed. Examples of such additional elements that have been proposed include cobalt, manganese, titanium, and aluminum.

$LiNiO_2$ containing an additional element M can be represented by the general formula: $Li[Li_x(Ni_aM_{1-a})_{1-x}]O_2$. Such a lithium-containing transition metal oxide can be produced by mixing a transition metal compound containing Ni and M with a lithium compound in a predetermined ratio, and heating the mixture to react the transition metal compound with the lithium compound. As the transition metal compound containing Ni and M, for example, a hydroxide is used. As the lithium compound, lithium carbonate, lithium hydroxide or the like is used.

Since lithium hydroxide is more expensive than lithium carbonate, it is more advantageous in terms of production costs to use lithium carbonate rather than lithium hydroxide. However, while the melting point of lithium hydroxide is 400° C., the melting point of lithium carbonate is 650° C. Hence, the temperature at which the reaction between lithium carbonate and a transition metal compound starts is higher than the temperature at which the reaction between lithium hydroxide and a transition metal compound starts by approximately 200° C.

However, when a transition metal compound of a high Ni content is reacted with a lithium compound, a $Ni^{3+}$ ion tends to be reduced to a $Ni^{2+}$ ion and included in the lithium site. This tendency increases as the reaction temperature between the transition metal compound and the lithium compound rises. When Ni is included in the lithium site, the product, i.e., the lithium-containing transition metal oxide, has low crystallinity and low characteristics as an active material.

It is therefore common to use expensive lithium hydroxide as the lithium compound to be reacted with a transition metal compound of a high Ni content (see Japanese Laid-Open Patent Publication No. Hei 11-307094). Although a production method using lithium carbonate has been disclosed, the Ni content of the transition metal oxide to be reacted therewith is low (Japanese Laid-Open Patent Publication No. 2002-110167).

BRIEF SUMMARY OF THE INVENTION

The invention reduces the problems arising from the use of a Ni-containing transition metal compound and inexpensive lithium carbonate as raw materials for synthesizing a lithium-containing transition metal oxide.

The invention relates to a method for producing a lithium-containing transition metal oxide represented by the general formula: $Li[Li_x(Ni_aM_{1-a})_{1-x}]O_2$ where M is metal other than Li and Ni, $0 \leq x$, and $0 < a$. The method includes: (i) mixing a transition metal compound containing Ni and M in a molar ratio of $a:(1-a)$ with lithium carbonate in a predetermined ratio; (ii) causing the temperature of the mixture to reach a predetermined temperature range while repeatedly raising and lowering the temperature thereof; and (iii) thereafter reacting the transition metal compound with the lithium carbonate in the predetermined temperature range.

In the step (ii), the transition metal compound and the lithium carbonate in the mixture may partially react with each other. The step (iii) is a process of reacting the unreacted transition metal compound with the lithium carbonate.

In the step (i), the lithium carbonate desirably has a mean particle size of 6 μm or less. Also, the transition metal compound is desirably a hydroxide. Further, the hydroxide is preferably produced by adding an alkali to an aqueous solution of a Ni salt and a salt of M to coprecipitate Ni and M.

The step (ii) includes raising the temperature of the mixture of the transition metal compound and the lithium carbonate on average while causing the mixture to flow, for example, in a rotating cylindrical kiln. The temperature at one end of the cylindrical kiln is lower than the temperature inside the cylindrical kiln, and the mixture is introduced from the one end. The inner face of the cylindrical kiln has a spiral groove or rib. By alternately switching the rotation direction of the cylindrical kiln to the opposite direction a plurality of times, the direction of travel of the mixture in the cylindrical kiln is switched. The temperature of the mixture is thus raised and lowered repeatedly.

The step (ii) is performed, for example, using a rotary kiln. It is efficient to continuously use the rotary kiln in the step (iii) following the step (ii).

The predetermined temperature range in the step (ii) and the step (iii) is preferably within the range of 550 to 750° C.

Preferably, the reaction product obtained in the step (iii) is further heated in a furnace. The heating temperature in the step (iii) is preferably 800 to 1100° C.

In the general formula: $Li[Li_x(Ni_aM_{1-a})_{1-x}]O_2$, preferably $0 \leq x \leq 0.3$ and $0.5 \leq a \leq 0.8$.

M preferably includes at least one selected from Mn and Co.

In addition to the at least one selected from Mn and Co, M may further include one or more other elements. As the one or more other elements, it is preferable to use at least one selected from the group consisting of aluminum, magnesium, calcium, strontium, yttrium, ytterbium, and iron.

By causing the temperature of the mixture of a Ni-containing transition metal compound and lithium carbonate to reach a predetermined temperature while repeatedly raising and lowering the temperature thereof, and thereafter reacting them, crystal growth is promoted. As a result, a lithium-containing transition metal oxide having a high Ni content but having high crystallininity can be obtained. The use of lithium carbonate having a mean particle size of 6 μm or less increases the effect of promoting crystal growth.

The lithium-containing transition metal oxide obtained by the production method of the invention has, for example, a layer structure and a crystal structure belonging to R3-m. The arrangement of oxygen is the cubic close-packed structure. The lithium-containing transition metal oxide obtained by the production method of the invention includes secondary particles having a mean particle size (D50) of, for example, 11 μm or less (preferably 5 μm or more). Also, the secondary particles are sintered primary particles having a mean particle size (D50) of, for example, 2 μm or less (preferably 0.1 μm or more). In a preferred mode, the mean particle size of the secondary particles is 2.5 to 30 times or 10 to 30 times the mean particle size of the primary particles. In a preferred mode, nickel and M are evenly dispersed on the atomic level or nano-level.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

The production method of a lithium-containing transition metal oxide represented by the general formula: $Li[Li_x(Ni_aM_{1-a})_{1-x}]O_2$ where M is metal other than Li and Ni, $0 \leq x$, and $0 < a$ is hereinafter described in detail.

Step (i)

A transition metal compound containing Ni and M in a molar ratio of a:(1−a) is mixed with lithium carbonate in a predetermined ratio. For example, a transition metal compound containing Ni and M is mixed with lithium carbonate so that the molar ratio of Li to the total of Ni and M: Li/(Ni+M) satisfies $0.97 \leq Li/(Ni+M) \leq 1.03$.

While the transition metal compound containing Ni and M is not particularly limited, it is desirably a hydroxide. A hydroxide containing Ni and M can be produced by adding an alkali to an aqueous solution of a Ni salt and a M salt to coprecipitate Ni and M. By mixing the hydroxide produced by coprecipitation with lithium carbonate and baking them by a predetermined method, a lithium-containing transition metal oxide in which Ni and M are evenly dispersed on the atomic level or nano-level can be obtained.

The Ni salt can be, but is not limited to, nickel sulfate. The M Salt can be, but is not limited to, a sulfate of M. The alkali can be, but is not limited to, an aqueous solution of NaOH or an aqueous solution of $NH_3$.

For example, an aqueous solution of a Ni salt, an aqueous solution of a Mn salt, and an aqueous solution of a Co salt are introduced into a reaction vessel while the amounts of the solutions are adjusted so as to provide a desired composition ratio. Simultaneously with this, an alkaline aqueous solution for neutralization is injected into the reaction vessel. It is preferable that each element of nickel, manganese, and cobalt form $Me(OH)_2$ wherein Me is nickel, manganese, or cobalt in the divalent state. It should be noted that $Ni(OH)_2$, $Co(OH)_2$, and $Mn(OH)_2$ have a similar layer structure. Hence, in a hydroxide containing divalent nickel, manganese, and cobalt, these three elements are evenly dispersed on the nano-level.

In the case of producing a hydroxide by coprecipitation, manganese is highly susceptible to oxidation. Manganese is readily oxidized to a trivalent manganese ion even by a trace amount of oxygen dissolved in an aqueous solution. A trivalent manganese ion forms MnOOH. Since MnOOH has a different structure from $Ni(OH)_2$, $Co(OH)_2$, and $Mn(OH)_2$, the three elements are unlikely to be evenly dispersed. To suppress this, it is preferable to expel dissolved oxygen by bubbling an inert gas such as nitrogen gas or argon gas into the aqueous solution. Alternatively, it is preferable to add a reducing agent such as ascorbic acid to the aqueous solution in advance.

Figure 1:
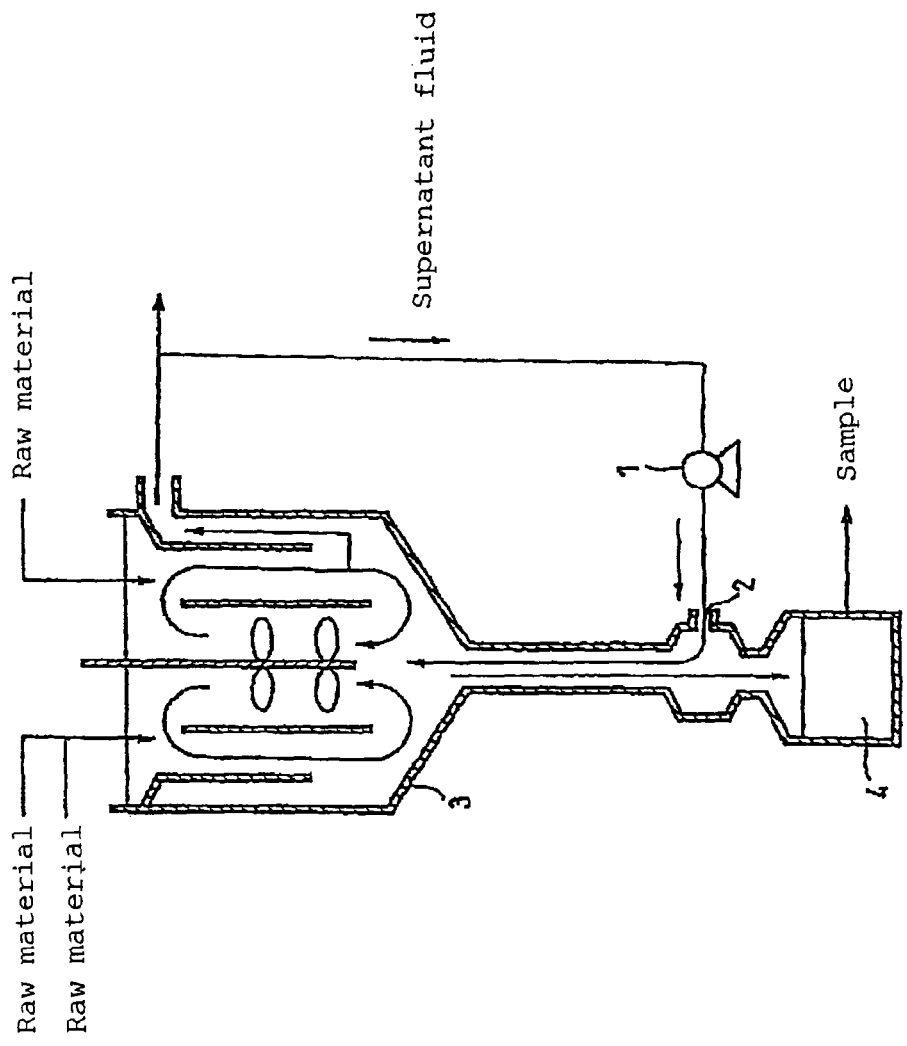
FIG. 1 is a schematic view of a device for synthesizing a hydroxide by coprecipitation.

A rapid coprecipitation reaction results in the formation of fine particles of a hydroxide having a low tap density. An active material synthesized by using such a hydroxide has a low tap density. However, a high tap density hydroxide can be produced by using a device as illustrated in FIG. 1. The device of FIG. 1 is designed so as to prevent initially coprecipitated crystalline nuclei from being collected. Specifically, using a pump 1, a mixed solution is circulated in a reaction vessel 3 from a supply port 2. The mixed solution is caused to flow from the bottom of the reaction vessel 3 upward, so that the mixed solution is caused to collide with crystalline nuclei that are sinking due to coprecipitation. A product collection section 4 is provided at a lower part of the device. Thus, only the hydroxide having crystallized to a certain extent and having an increased specific gravity can sink and reach the collection section 4 without being pushed back by the flow of the mixed solution.

According to the above method, a hydroxide having a large particle size of approximately 10 μm and a tap density of 2 g/cm³ or more can be easily produced. As a result, it is possible to efficiently produce a lithium-containing transition metal oxide including secondary particles having a mean particle size (D50) of 11 μm or less (preferably 5 μm or more), wherein the secondary particles are sintered primary particles having a mean particle size (D50) of 2 μm or less (preferably 0.1 μm or more) and the mean particle size of the secondary particles is 2.5 to 30 times or 10 to 30 times the mean particle size of the primary particles.

The mean particle size of lithium carbonate to be mixed with the transition metal compound containing Ni and M is desirably 6 μm or less, and more desirably 2.5 to 5 μm. The use of lithium carbonate having a small mean particle size is thought to further promote the crystal growth of the lithium-containing transition metal oxide, suppressing the undesirable inclusion of Ni into the lithium site.

The baking temperature of the raw materials has a large effect on the performance of the product lithium-containing transition metal oxide. It is known that when a raw material transition metal compound of a high Ni content is baked at a high temperature, a disorder of a position interchange between a lithium ion and a nickel ion occurs. In this case, a nickel ion is undesirably substituted for the site a lithium ion is supposed to occupy. Hence, the movement of lithium ions due to charge/discharge is impeded, thereby resulting in low capacity. On the other hand, in order to increase the tap density of the product, it is preferable to bake the raw materials at a high temperature to enhance the crystallinity.

To improve the relation of such trade-off, it is common to use as the raw material lithium hydroxide that is likely to yield a well-crystallized product even when a low temperature baking is performed. Generally, when the ratio of Ni to the total of Ni and M exceeds 70 mol %, a high temperature baking cannot be performed. Thus, unless lithium hydroxide is used, it is difficult to synthesize a lithium-containing transition metal oxide. However, the use of lithium hydroxide as the raw material makes the cost several times higher than the use of lithium carbonate as the raw material.

However, according to the production method of the invention, even when a high temperature baking is performed, a disorder of a position interchange between a lithium ion and a nickel ion can be suppressed, and lithium carbonate can thus be used as the lithium raw material.

Step (ii)

The temperature of the mixture of the transition metal compound containing Ni and M and lithium carbonate is caused to reach a predetermined temperature range while the temperature thereof is repeatedly raised and lowered. That is, the step (ii) is a process of raising the temperature of the mixture to the predetermined temperature range. At this time, air or oxygen is supplied to the mixture. It should be noted that the supply of air is desirable in terms of costs. Usually, when the Ni content in the transition metal compound is high, it is necessary to set the oxygen partial pressure of the baking atmosphere at a certain level or higher; however, in the invention, the oxygen partial pressure can be made lower than conventional one. It is thus possible to use air even when the Ni content in the transition metal compound is high.

The step (ii) includes raising the temperature of the mixture of the transition metal compound and lithium carbonate on average while causing the mixture to flow, for example, in a rotating cylindrical kiln. The inner face of the cylindrical kiln has a spiral groove or rib. When the mixture is supplied from one end of the cylindrical kiln thereinto, it moves along the groove or rib in the cylindrical kiln. During the movement of the mixture along the groove or rib in the cylindrical kiln, by switching the rotation direction of the cylindrical kiln to the opposite direction, the direction of travel of the mixture is reversed. Hence, by providing the cylindrical kiln with temperature variation and switching the rotation direction of the cylindrical kiln to the opposite direction a plurality of times, the temperature of the mixture is repeatedly raised and lowered. Also, by switching the rotation direction, the evenness of the mixed materials can be enhanced. As a result, the reaction proceeds uniformly and the reactivity improves.

In the process of raising the temperature of the mixture to a predetermined temperature range, the preferable average temperature increase rate of the mixture in the cylindrical kiln is, for example, 1° C./min to 8° C./min, and further 2° C./min to 5° C./min. In the process of raising the temperature, it is preferable to switch the rotation direction of the cylindrical kiln to the opposite direction 150 to 250 times in terms of enhancing the reactivity.

Figure 2:
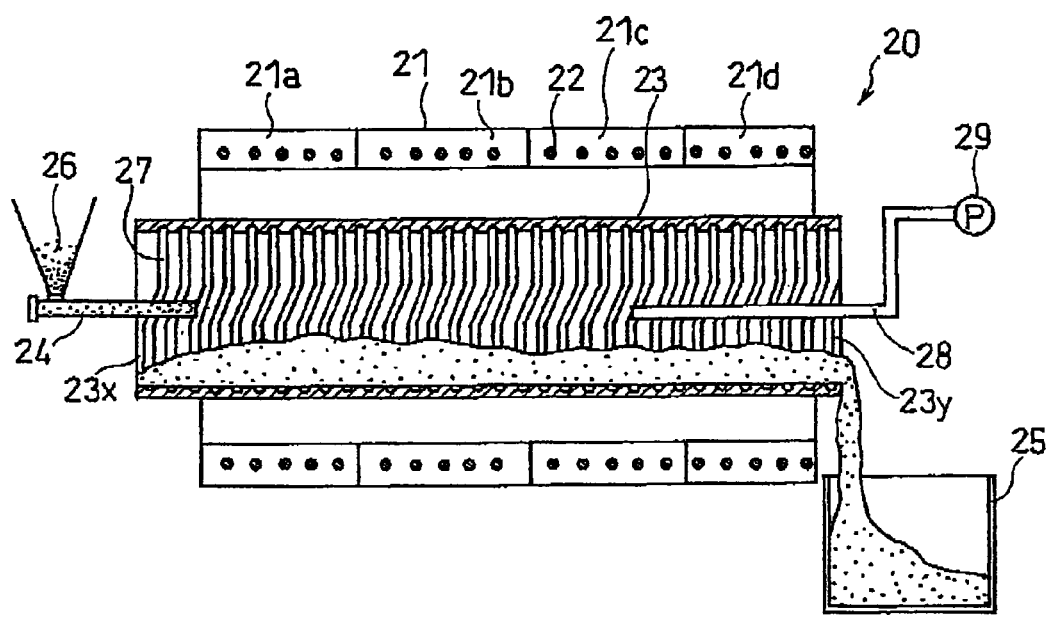
FIG. 2 is a schematic sectional view of the structure of an exemplary rotary kiln.

The step (ii) can be performed using various types of rotary kilns. FIG. 2 is a schematic sectional view of the structure of an exemplary rotary kiln.

A rotary kiln 20 includes a body 21 and a cylindrical kiln 23. The rotation speed and rotation direction of the cylindrical kiln can be controlled freely. The body 21 has a heater 22 therein. The heater 22 is divided into several zones. The temperature of each zone can be controlled independently. For example, a first zone 21a and a second zone 21b are used in the process of raising the temperature of the mixture to a predetermined temperature range. The temperature range of the second zone 21b is set higher than that of the first zone 21a.

At an end 23x of the cylindrical kiln 23, there is provided an inlet 24 for a mixture 26. The inner face of the cylindrical kiln 23 is provided with a spiral groove or rib 27 having the function of causing the mixture to move from the end 23x of the cylindrical kiln 23 to the other end 23y. The reaction product after baking is discharged from the end 23y of the cylindrical kiln 23 and collected into a collection container 25.

From the end 23y of the cylindrical kiln 23, a gas supply pipe 28 is inserted into the cylindrical kiln. Through the gas supply pipe 28, oxygen or air supplied from a pump 29 is introduced into the cylindrical kiln.

The temperatures of the first zone 21a and the second zone 21b are controlled so that the temperature of the cylindrical kiln 23 gradually rises from the end 23x inward. When the rotation direction of the cylindrical kiln 23 is the normal direction, the mixture moves toward the end 23y due to the function of the groove or rib 27. On the other hand, if the rotation direction is the opposite direction, the mixture moves toward the end 23x. Thus, the temperature of the mixture rises when the rotation direction of the cylindrical kiln 23 is the normal direction, and lowers when it is the opposite direction.

Figure 3:
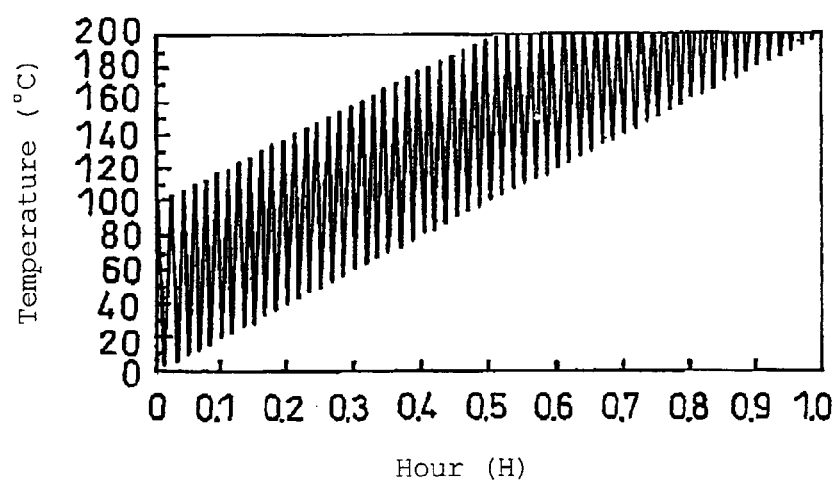
FIG. 3 is an exemplary temperature profile in the process of raising the temperature of a mixture.

In the case of switching the rotation direction of the cylindrical kiln 23 regularly, by setting each rotation time for the normal direction longer than that for the opposite direction, the mixture as a whole moves toward the end 23y. At this time, each rotation time Ta for the normal direction is preferably in the range of 0.8 minute to 1.2 minutes. Also, each rotation time Tb for the opposite direction is preferably, for example, $0.6Ta \leqq Tb \leqq 0.9Ta$. Further, the temperature change $\Delta t$ of the mixture caused by switching the rotation direction once is preferably 2 to 15° C. A temperature profile of the mixture at a temperature change $\Delta t$ of 100° C. is shown in FIG. 3.

The predetermined temperature range in the step (ii) is preferably in the range of 550 to 750° C. By setting the predetermined temperature range to 550° C. or more, the reaction is effectively carried out, and by setting it to 750° C. or less, a disorder of undesirable inclusion of a nickel ion in the site a lithium ion is supposed to occupy can be effectively suppressed.

Step (iii)

Thereafter, the transition metal compound is reacted with lithium carbonate in the predetermined temperature range, preferably the range of 550 to 750° C. Normally, the step (iii) is performed subsequently to the step (ii). For example, the step (iii) is performed in the same manner as in the step (ii) except that the temperature of the cylindrical kiln is maintained in the predetermined temperature range. The reaction atmosphere may also be oxygen atmosphere or air. The reaction time is preferably 1.5 to 5 hours, and further 2.5 to 3.5 hours.

For example, a third zone 21c and a fourth zone 21d in FIG. 2 are used in the process of reacting the unreacted transition metal compound with lithium carbonate. The temperatures of the third zone 21c and the fourth zone 21d are controlled so that the temperature of the mixture is almost constant from the central part of the cylindrical kiln to the end 23y. Alternatively, their temperatures are controlled so that the temperature of the mixture is almost constant from the central part of the cylindrical kiln to a predetermined position, and that the temperature of the mixture gradually lowers from the predetermined position to the end 23y.

Step (iv)

It is desirable to further heat the reaction product obtained in the step (iii) at a higher temperature. The step (iv) enhances the crystallinity of the product, yielding a lithium-containing transition metal oxide having more excellent characteristics as an active material. The further heating can be performed in a furnace. The heating atmosphere may be oxygen atmosphere or air. The heating temperature is preferably 800 to 1100° C., and further 825 to 950° C., and the heating time is preferably 8 to 25 hours, and further 10 to 20 hours.

The production method of the invention is particularly effective when the general formula: $Li[Li_x(Ni_aMi_{1-a})_{1-x}]O_2$ satisfies $0 \leq x \leq 0.3$, and is particularly effective when it satisfies $0.3 \leq a \leq 0.9$, $0.5 \leq a \leq 0.8$ or $0.5 \leq a \leq 0.7$.

It is preferable that M include at least one selected from Mn and Co. M may be Mn only, may be Co only, or may be both Mn and Co only. When M include both Mn and Co, the molar ratio of Mn to Co is preferably from 1:3 to 3:1, and more preferably 1:1. Also, the molar ratio of Ni to Mn is preferably from 3:1 to 1:1, and more preferably 3:1, 2:1 or 1:1.

When M includes one or more other elements in addition to at least one selected from Mn and Co, the amount of the one or more other elements is preferably 0.1 to 7 mol %, and further 0.5 to 3.5 mol % of the total of Ni and M. The one or more other elements are preferably at least one selected from the group consisting of aluminum, magnesium, calcium, strontium, yttrium, ytterbium, and iron.

M is thought to have effects such as enhancing the thermal stability of the lithium-containing transition metal oxide. Particularly when M contains aluminum or magnesium, the effect of enhancing the thermal stability increases. Also, when a lithium-containing transition metal oxide in which M is cobalt is included as an active material in a non-aqueous electrolyte secondary battery, polarization in the final stage of discharge is reduced. When M is iron, essentially the same effects can also be obtained.

The general configuration of the non-aqueous electrolyte secondary battery using a lithium-containing transition metal oxide as a positive electrode active material is hereinafter described.

The positive electrode usually includes a positive electrode current collector and a positive electrode mixture carried thereon. The positive electrode mixture can contain a positive electrode active material, a binder, a conductive agent, and the like. The positive electrode is produced, for example, by mixing a positive electrode mixture comprising a positive electrode active material and optional components with a liquid component to prepare a positive electrode mixture slurry, applying the slurry to a positive electrode current collector, and drying it.

Likewise, the negative electrode is produced by mixing a negative electrode mixture comprising a negative electrode active material and optional components with a liquid component to prepare a negative electrode mixture slurry, applying the slurry to a negative electrode current collector, and drying it. Examples of negative electrode active materials which can be used include metals, metal fibers, carbon materials, oxides, nitrides, tin compounds, silicon compounds, and various alloy materials. Examples of carbon materials which can be used are carbon materials such as various natural graphites, coke, graphitizable carbon, carbon fibers, spherical carbon, various artificial graphites, and amorphous carbon. Also, simple substances such as silicon (Si) or tin (Sn), alloys containing silicon or tin, and compounds or solid solutions containing silicon or tin are preferable since they have high capacity density. For example, preferable silicon compounds are $SiO_x$ wherein $0.05 < x < 1.95$.

Examples of binders which can be used in the positive electrode or negative electrode include polyvinylidene fluoride (PVDF), polytetrafluoroethylene, polyethylene, polypropylene, aramid resin, polyamide, polyimide, polyamideimide, polyacrylnitrile, polyacrylic acid, polymethyl acrylates, polyethyl acrylates, polyhexyl acrylates, polymethacrylic acid, polymethyl methacrylates, polyethyl methacrylates, polyhexyl methacrylates, polyvinyl acetates, polyvinyl pyrrolidone, polyether, polyethersulfone, hexafluoropolypropylene, styrene butadiene rubber, and carboxymethyl cellulose. It is also possible to use a copolymer of two or more materials selected from tetrafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene. It is also possible to use two or more selected therefrom in combination.

Examples of conductive agents included in the electrode include graphites such as natural graphite and artificial graphite, carbon blacks such as acetylene black, ketjen black, channel black, furnace black, lamp black, and thermal black, conductive fibers such as carbon fibers and metal fibers, carbon fluoride, metal powders such as aluminum, conductive whiskers such as zinc oxide and potassium titanate, conductive metal oxides such as titanium oxide, and organic conductive materials such as phenylene derivatives.

With respect to the mixing ratio of the positive electrode active material, the conductive agent, and the binder, it is desirable to use 80 to 97% by weight of the positive electrode active material, 1 to 20% by weight of the conductive agent, and 1 to 10% by weight of the binder. Also, with regard to the mixing ratio of the negative electrode active material and the binder, it is desirable to use 93 to 99% by weight of the negative electrode active material and 1 to 10% by weight of the binder.

The current collector can be a long conductive substrate. The positive electrode current collector can be made of, for example, stainless steel, aluminum, or titanium. The negative electrode current collector can be made of, for example, stainless steel, nickel, or copper. While the thickness of the current collector is not particularly limited, it is preferably 1 to 500 μm, and more desirably 5 to 20 μm.

The separator interposed between the positive electrode and the negative electrode can be made of, for example, a microporous thin film, woven fabric, or non-woven fabric having high ion permeability, predetermined mechanical strength, and an insulating property. With respect to the material of the separator, for example, polyolefin such as polypropylene or polyethylene has good durability and a shut-down function, so it is preferable in terms of safety. The thickness of the separator is preferably 15 to 30 μm, and more preferably 10 to 25 μm. The microporous thin film may be a monolaminar film made of one material, or may be a composite film or multilaminar film made of one or more materials. The porosity of the separator (the ratio of the pore volume to the apparent volume) is preferably 30 to 70%, and more preferably 35 to 60%.

The non-aqueous electrolyte can be a liquid, gelled, or solid substance. A liquid non-aqueous electrolyte (non-aqueous electrolyte) can be obtained by dissolving a solute (e.g., lithium salt) in a non-aqueous solvent. The desirable amount of the solute dissolved in the non-aqueous solvent is in the range of 0.5 to 2 mol/L. A gelled non-aqueous electrolyte includes a non-aqueous electrolyte and a polymer material holding the non-aqueous electrolyte. Preferable examples of polymer materials include polyvinylidene fluoride, polyacrylonitrile, polyethylene oxide, polyvinyl chloride, polyacrylate, and a vinylidene fluoride-hexafluoropropylene copolymer.

The kind of the non-aqueous solvent for dissolving the solute is not particularly limited; for example, cyclic carbonic acid esters, chain carbonic acid esters, and cyclic carboxylic acid esters are used. Examples of cyclic carbonic acid esters include propylene carbonate (PC) and ethylene carbonate (EC). Examples of chain carbonic acid esters include diethyl carbonate (DEC), ethyl methyl carbonate (EMC), and dimethyl carbonate (DMC). Examples of cyclic carboxylic acid esters include γ-butyrolactone (GBL) and γ-valerolactone (GVL). These non-aqueous solvents can be used singly or in combination of two or more of them.

Examples of the solute to be dissolved in the non-aqueous solvent include $LiClO_4$, $LiBF_4$, $LiPF_6$, $LiAlCl_4$, $LiSbF_6$, LiSCN, $LiCF_3SO_3$, $LiCF_3CO_2$, $LiAsF_6$, $LiB_{10}Cl_{10}$, and imide salts. Examples of imide salts include lithium bistrifluoromethanesulfonyl imide (($CF_3SO_2)_2NLi$), lithium trifluoromethanesulfonyl nonafluorobutanesulfonyl imide (LiN($CF_3SO_2$)($C_4F_9SO_2$)) and lithium bispentafluoroethanesulfonyl imide (($C_2F_5SO_2)_2NLi$). These solutes can be used singly or in combination of two or more of them.

The non-aqueous electrolyte can contain various additives. Examples of additives include vinylene carbonate (VC), 4-methylvinylene carbonate, 4,5-dimethylvinylene carbonate, 4-ethylvinylene carbonate, 4,5-diethylvinylene carbonate, 4-propylvinylene carbonate, 4,5-dipropylvinylene carbonate, 4-phenylvinylene carbonate, 4,5-diphenylvinylene carbonate, vinyl ethylene carbonate (VEC), divinyl ethylene carbonate, cyclohexyl benzene, biphenyl, and diphenyl ether. They can be used singly or in combination of two or more of them. Among them, at least one selected from the group consisting of vinylene carbonate, vinyl ethylene carbonate, and divinyl ethylene carbonate is preferable.

The invention is hereinafter described specifically based on Examples, but the invention is not to be construed as being limited to the following Examples.

EXAMPLE 1

(a) Synthesis of a Lithium-Containing Transition Metal Oxide
Step (i)

An aqueous solution of nickel sulfate, an aqueous solution of manganese sulfate, and an aqueous solution of cobalt sulfate, having a concentration of 1.2 mol/L, were prepared. These aqueous solutions were introduced into a reaction vessel having an internal volume of 5 L while their amounts were adjusted so that the molar ratio was Ni:Mn:Co=3:1:1. The introduction rate of the total of these aqueous solutions was set to 1.5 ml/min. Simultaneously with this, an aqueous solution of 4.8 mol/L NaOH was introduced into the reaction vessel at an introduction rate of 0.75 ml/min. Argon gas was bubbled in the aqueous solution in the reaction vessel to expel dissolved oxygen. In this way, a coprecipitation reaction was carried out. Also, as illustrated in FIG. 1, the aqueous solution was caused to flow from the bottom of the reaction vessel upward, so that the mixed solution was caused to collide with crystalline nuclei that were sinking due to coprecipitation. As a result, only the hydroxide that had crystallized to a certain extent sank in the sample collection section. In this way, a coprecipitated hydroxide represented by $Ni_{3/5}Mn_{1/5}Co_{1/5}(OH)_2$ (Ni:M=0.6:(1−0.6)=0.6:0.4) was obtained.

The coprecipitated hydroxide obtained was mixed with lithium carbonate (mean particle size 6 μm) so that the molar ratio of (Ni+Mn+Co):Li was 1:1.03.

It should be noted that the mean particle size (D50) of lithium carbonate is the volume basis median diameter as determined by a laser diffraction type particle size distribution analyzer.
Step (ii)

The mixture thus obtained was introduced into a rotary kiln having a cylindrical kiln as illustrated in FIG. 2. Specifically, the mixture was introduced from one end of the cylindrical kiln rotating at a rotation speed of 2 rpm, and the rotation direction of the cylindrical kiln was regularly switched to the opposite direction (normal direction: 1 minute, opposite direction: 50 seconds). Air was introduced into the cylindrical kiln at a flow rate of 10 L/min. The temperature of the cylindrical kiln was controlled so that the temperature of the introduced mixture reached approximately 700° C. near the center of the cylindrical kiln. That is, the mixture of the hydroxide and the lithium carbonate moved along the groove in the rotating cylindrical kiln while the temperature thereof was raised and lowered repeatedly, so that the mixture was heated to 700° C. at an average temperature increase rate of approximately 3.2° C./min.
Step (iii)

Thereafter, the mixture traveled through the area of the cylindrical kiln where the temperature was maintained at approximately 700° C. in a time of 5 hours, and was discharged from the cylindrical kiln. During the travel, the reaction between the hydroxide and the lithium carbonate proceeded further.
Step (iv)

The reaction product (lithium-containing transition metal oxide) obtained in the step (iii) was collected from the cylindrical kiln, coarsely crushed, and charged into a ceramics container. This was introduced into a furnace, where it was heated in air at 925° C. for 7 hours to enhance the crystallinity of the lithium-containing transition metal oxide. The lithium-containing transition metal oxide was then broken, preliminarily crushed with a roller, and further pulverized/adjusted to a predetermined particle size. In this way, a lithium-containing transition metal oxide represented by $LiNi_{3/5}Mn_{1/5}Co_{1/5}O_2$ was produced.

The lithium-containing transition metal oxide thus obtained was subjected to an XRD analysis, and peaks attributed to the (003) plane and the (104) plane were observed. The ratio of the peak attributed to the (003) plane to the peak attributed to the (104) plane: (003)/(104) was 1.61.

The peak attributed to the (003) plane is a reflection from the layered rock salt structure belonging to R3–m. The peak attributed to the (104) plane is the total sum of the reflections from both the layered rock salt structure belonging to R3–m and the cubic rock salt structure belonging to Fm3–m. Thus, the peak ratio: (003)/(104) represents the degree of crystallinity of the layer structure belonging to R3–m.
(b) Preparation of Positive Electrode The lithium-containing transition metal oxide (mean particle size D50: 8.8 μm) produced in (a) above was used as the positive electrode active material. The mean particle size (D50) of the lithium-containing transition metal oxide is the volume basis median diameter determined by a laser diffraction-type particle size distribution analyzer.

A positive electrode mixture was prepared by mixing 85 parts by weight of the positive electrode active material, 10 parts by weight of acetylene black as a conductive agent, and 5 parts by weight of polytetrafluoroethylene (PTFE) as a binder. The positive electrode mixture was molded into a pellet having a diameter of 12.5 mm and a thickness of 0.2 mm, to obtain a positive electrode.

(c) Preparation of Negative Electrode

A 0.15-mm thick lithium metal foil was punched to a diameter of 18 mm, to obtain a negative electrode.

(d) Preparation of Non-Aqueous Electrolyte

A non-aqueous electrolyte was prepared by dissolving $LiPF_6$ at a concentration of 1 mol/L in a solvent mixture of ethylene carbonate and ethyl methyl carbonate in a volume ratio of 1:3.

(e) Production of Coin Battery

Using the positive electrode, the negative electrode, the non-aqueous electrolyte, and a separator, a coin battery (R2016) having an outer diameter of 20 mm and a height of 1.6 mm was produced. First, a polypropylene gasket was fitted to the circumference of a negative electrode case, and the negative electrode (lithium metal foil) was pressed to the inner face of the negative electrode case. A trilaminar separator of polypropylene/polyethylene/polypropylene having a total thickness of 200 µm was mounted so as to cover the upper face of the negative electrode. Then, the non-aqueous electrolyte was injected into the negative electrode case from above the separator. Next, the positive electrode was mounted so as to face the negative electrode with the separator interposed therebetween, and the opening of the negative electrode case was sealed with a positive electrode case. In this way, a battery (nominal capacity 10 mAh) was completed.

(f) Evaluation of Discharge Characteristic

Charging conditions: in a 25° C. environment, a charge/discharge cycle of a charge to 4.3 V at a constant current of 0.5 C and a discharge to 3 V at a constant current of 0.5 C was repeated three times. The discharge capacity of the positive electrode active material thus obtained was mAh/g.

COMPARATIVE EXAMPLE 1

In synthesizing a lithium-containing transition metal oxide, the same coprecipitated hydroxide as that of Example 1 and lithium carbonate (mean particle size 60 µm) were mixed so that the molar ratio of (Ni+Mn+Co):Li was 1:1.03. The mixture was charged into a ceramics container. This was introduced into a furnace, where it was heated in air at 700° C. for 5 hours and further heated at 925° C. for 7 hours, to obtain a lithium-containing transition metal oxide. The lithium-containing transition metal oxide was then broken, preliminarily crushed with a roller, and further pulverized/adjusted to a predetermined particle size.

The lithium-containing transition metal oxide of Comparative Example 1 was subjected to an XRD analysis, and peaks attributed to the (003) plane and the (104) plane were observed. The ratio of the peak attributed to the (003) plane to the peak attributed to the (104) plane: (003)/(104) was 1.55.

A coin battery was produced in the same manner as in Example 1 except for the use of the lithium-containing transition metal oxide of Comparative Example 1. The discharge capacity of the positive electrode active material was checked in the same manner, and it was found to be 151 mAh/g.

The results of Example 1 and Comparative Example 1 are shown in Table 1.

TABLE 1

|  | Example 1 | Comparative Example 1 |
|---|---|---|
| Peak ratio: (003)/(104) | 1.61 | 1.55 |
| Discharge capacity of positive electrode active material | 175 mAh/g | 151 mAh/g |

The invention is useful as a method for producing a lithium-containing transition metal oxide that is useful as a positive electrode active material for non-aqueous electrolyte batteries such as lithium secondary batteries. Non-aqueous electrolyte secondary batteries are useful as the power source for electronic devices such as notebook personal computers, cellular phones, and digital still cameras, and as the power source for power storage and electric vehicles in which high power is required.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A method for producing a lithium-containing transition metal oxide represented by the general formula: $Li[Li_x(Ni_aM_{1-a})_{1-x}]O_2$ where M is a metal other than Li and Ni, 0<x, and 0<a, the method comprising:
   (i) mixing a transition metal compound containing Ni and M in a molar ratio of a:(1−a) with lithium carbonate in a predetermined ratio;
   (ii) causing the mixture to flow in a rotating cylindrical kiln to reach a predetermined temperature range while repeatedly raising and lowering the temperature thereof; and
   (iii) thereafter reacting the transition metal compound with the lithium carbonate in the predetermined temperature range, wherein:
   temperature at one end of the cylindrical kiln is lower than temperature inside the cylindrical kiln, the mixture is introduced from said one end,
   an inner face of the cylindrical kiln has a spiral groove or rib, and
   a rotation direction of the cylindrical kiln is switched between a normal direction and a direction opposite thereof multiple times.

2. The method for producing a lithium-containing transition metal oxide in accordance with claim 1, wherein the lithium carbonate has a mean particle size of 6 µm or less.

3. The method for producing a lithium-containing transition metal oxide in accordance with claim 1, wherein the transition metal compound comprises a hydroxide.

4. The method for producing a lithium-containing transition metal oxide in accordance with claim 3, wherein the hydroxide is produced by adding an alkali to an aqueous solution of a Ni salt and a salt of M to coprecipitate Ni and M.

5. The method for producing a lithium-containing transition metal oxide in accordance with claim 1, wherein the step (ii) is performed using a rotary kiln.

6. The method for producing a lithium-containing transition metal oxide in accordance with claim 1, wherein the predetermined temperature range in the step (ii) and the step (iii) is within the range of 550° C. to 750° C.

7. The method for producing a lithium-containing transition metal oxide in accordance with claim 1, further comprising the step (iv) of further heating the reaction product obtained in the step (iii) in a furnace.

8. The method for producing a lithium-containing transition metal oxide in accordance with claim 7, wherein the heating temperature in the step (iv) is 800° C. to 1100° C.

9. The method for producing a lithium-containing transition metal oxide in accordance with claim 1, wherein $0 \leq x \leq 0.3$ and $0.5 \leq a \leq 0.8$.

10. The method for producing a lithium-containing transition metal oxide in accordance with claim 1, wherein M includes at least one selected from Mn and Co.

11. The method for producing a lithium-containing transition metal oxide in accordance with claim 10, wherein M further includes at least one selected from the group consisting of aluminum, magnesium, calcium, strontium, yttrium, ytterbium, and iron.

12. The method for producing a lithium-containing transition metal oxide in accordance with claim 1, wherein the lithium carbonate has a mean particle size of 2.5 to 5 μm.

13. The method for producing a lithium-containing transition metal oxide in accordance with claim 1, wherein the rotation direction of the cylindrical kiln is switched by setting each rotation time for the normal direction longer than that for the opposite direction.

14. The method for producing a lithium-containing transition metal oxide in accordance with claim 13, wherein each rotation time Ta for the normal direction is in the range of 0.8 minutes to 1.2 minutes, and each rotation time Tb for the opposite direction is $0.6Ta \leq Tb \leq 0.9Ta$.

15. The method for producing a lithium-containing transition metal oxide in accordance with claim 14, wherein the temperature change Δt of the mixture caused by switching the rotation direction once is 2 to 15° C.

16. The method for producing a lithium-containing transition metal oxide in accordance with claim 5, wherein the rotary kiln is divided into several zones and the temperature of each zone is controlled independently.

* * * * *